US008209181B2

(12) United States Patent
Heckerman et al.

(10) Patent No.: US 8,209,181 B2
(45) Date of Patent: Jun. 26, 2012

(54) PERSONAL AUDIO-VIDEO RECORDER FOR LIVE MEETINGS

(75) Inventors: David E. Heckerman, Bellevue, WA (US); Robert L. Rounthwaite, Fall City, WA (US)

(73) Assignee: Microsoft Corporation, Redmond, WA (US)

( * ) Notice: Subject to any disclaimer, the term of this patent is extended or adjusted under 35 U.S.C. 154(b) by 1260 days.

(21) Appl. No.: 11/353,382

(22) Filed: Feb. 14, 2006

(65) Prior Publication Data

US 2007/0188901 A1 Aug. 16, 2007

(51) Int. Cl.
*G10L 21/00* (2006.01)

(52) U.S. Cl. ..... 704/270; 715/202; 715/700; 379/88.02; 725/87; 725/10

(58) Field of Classification Search .................. 704/270; 360/23; 715/811, 723, 203; 709/228; 434/236; 368/95; 348/14.01
See application file for complete search history.

(56) References Cited

U.S. PATENT DOCUMENTS

| | | | | |
|---|---|---|---|---|
| 5,692,213 | A * | 11/1997 | Goldberg et al. | 715/203 |
| 6,606,111 | B1 * | 8/2003 | Kondo et al. | 348/14.01 |
| 6,964,023 | B2 * | 11/2005 | Maes et al. | 715/811 |
| 2002/0087328 | A1 * | 7/2002 | Denenberg et al. | 704/275 |
| 2002/0144259 | A1 * | 10/2002 | Gutta et al. | 725/10 |
| 2003/0046080 | A1 * | 3/2003 | Hejna, Jr. | 704/270 |
| 2003/0052911 | A1 * | 3/2003 | Cohen-solal | 345/738 |
| 2003/0105870 | A1 * | 6/2003 | Baum | 709/228 |
| 2003/0212646 | A1 * | 11/2003 | Horvitz | 706/46 |
| 2003/0229900 | A1 * | 12/2003 | Reisman | 725/87 |
| 2004/0068481 | A1 * | 4/2004 | Seshadri et al. | 707/1 |
| 2004/0091086 | A1 * | 5/2004 | Ortel | 379/88.02 |
| 2004/0168118 | A1 * | 8/2004 | Wong et al. | 715/500.1 |
| 2004/0183749 | A1 * | 9/2004 | Vertegaal | 345/7 |
| 2005/0146990 | A1 * | 7/2005 | Mayer | 368/95 |
| 2005/0216549 | A1 * | 9/2005 | Amano et al. | 709/202 |
| 2006/0093998 | A1 * | 5/2006 | Vertegaal | 434/236 |
| 2007/0113182 | A1 * | 5/2007 | Hollemans | 715/723 |

OTHER PUBLICATIONS

Wayman, James. L., "Some Improvements on the Synchronized-Overlap-Add-Method of Time Scale Modification for Use in Real-Time Speech Compression and Noise Filtering", Jan. 1988, IEEE, vol. 36, No. 1, pp. 139-140.*
Berna Erol et al., "Linking Presentation Documents Using Image Analysis", 2003, IEEE, p. 97-101.*
Paul H. Dietz et al., "Real-time Audio Buffering for Telephone Applications", UIST, 2001. p. 193-194.*

* cited by examiner

*Primary Examiner* — Douglas Godbold
*Assistant Examiner* — Mark Villena
(74) *Attorney, Agent, or Firm* — Lee & Hayes, PLLC (57) ABSTRACT

A unique recording system and method that facilitates recording live meetings, discussions or conversations whereby such recordings are available for immediate or near immediate playback is provided. As a result, a user who has momentarily become distracted or inattentive during the meeting can quickly re-listen to what was missed or misunderstood in order to readily catch up to the current discussion. The current discussion can continue to be recorded during playback of any previously recorded data. User behavior can be monitored to estimate when the user has started to become inattentive and likely segments or time points of the recordings can be suggested for playback. One or more portions of the recordings can be filtered or selected for playback so that any desired content can be eliminated or skipped in the playback version.

20 Claims, 9 Drawing Sheets

PERSONAL AUDIO-VIDEO RECORDER FOR LIVE MEETINGS

BACKGROUND

Staying focused in the current fast-paced environments of work or school can be challenging particularly during a meeting, discussion, or class. The material may be less interesting at times, leaving the person bored and easily distracted with other more intriguing thoughts such as what to eat for dinner, planning an upcoming vacation, reading email, or surfing the Internet. Alternatively, the information may be very interesting but voluminous and complex, making it difficult for a person to keep up with the onslaught of incoming information and difficult terminology. In addition, the speaker may be jumping between topics or may simply talk quickly, thereby making him/her difficult to understand. In any of these situations, current technologies are limited to only allowing the person to record the information for later retrieval. This tends to be problematic because understanding or comprehending the information at the current time rather than later may be necessary or preferred. In order to avoid missing even more of the discussion, any information missed by the user typically cannot be accessed until later using conventional techniques or practices.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The subject application relates to a system(s) and/or methodology that facilitate selective playback of recorded data while concurrently recording current (live) data. More specifically, audio input, for instance, can be recorded in real-time. At least a subset of the recorded data can be played back by a user at various speeds such as faster than real-time to allow the user to catch up with the current live audio. By speeding up the playback of the audio, the user can obtain the missed information and quickly catch up to the live meeting. Thus, during playback, the system and/or methodology can continue to record any live data.

Various playback controls can be employed to select which bits of audio are played for the user. For example, the user can jump back 30 seconds ago to listen to that piece of information. Filters can be utilized to exclude background noises or extended pauses in the audio. Alternatively or in addition, speech or voice recognition filters can be employed to select which speakers to replay or which to skip. In practice, imagine that the user is attending a 3-person panel discussion on the latest high blood pressure therapies. In the last 5 minutes, all 3 panelists gave their comments regarding a new FDA-approved drug but the user is only interested in what Dr. Jones said. Using the speech recognition filter, the user can exclude the audio from the other 2 speakers and playback anything that Dr. Jones said in the last 5 minutes up to the current discussion. Sneezes, coughs, cell phone rings, or any other undesirable noises can be eliminated as well.

Furthermore, playback of recorded information can be performed via speech recognition and text display. In particular, speech recognition technologies can be employed to "speak" selected portions of the recorded audio. Any recognized speech can be presented on-screen or by some other display means to the user.

Artificial intelligence schemes can also be employed to estimate when the user has become less attentive or has been distracted from the live meeting. This can be accomplished in part by using a monitoring device such as a camera to observe the user's actions, activities, or behavior. For example, the monitoring device can detect changes in eye movements or body positions and/or an increase in activity on the user's computing device that is potentially unrelated to the live meeting (e.g., email, internet, opened documents, etc.). When the user is actively taking notes on the computing device during the meeting, a decrease in activity can be observed as well and noted as a likely sign of inattentiveness. Such artificial intelligence schemes can estimate where in the meeting according to a time point the user may have missed and then suggest playback segments. The suggestions can be ignored or stored as desired by the user.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION

The subject systems and/or methods are now described with reference to the drawings, wherein like reference numerals are used to refer to like elements throughout. In the following description, for purposes of explanation, numerous specific details are set forth in order to provide a thorough understanding of the systems and/or methods. It may be evident, however, that the subject systems and/or methods may be practiced without these specific details. In other instances, well-known structures and devices are shown in block diagram form in order to facilitate describing them.

As used herein, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

The subject systems and/or methods can incorporate various inference schemes and/or techniques in connection with recognizing when a user has become inactive or experiences a loss of attention and estimating which portions of recorded information should be played back. In particular, imagine that a user is attending a team meeting and has become distracted as a result of some commotion occurring outside the meeting room. A monitoring device on the user's computer can observe the user and detect his/her head and/or eye movements and determine that the speaker has lost the user's attention. The various inference schemes can estimate the point in time when the user's attention was lost and then suggest segments of recorded information to playback to the user to catch him up to the current subject matter of the meeting. Inference schemes can also be employed in connection with analyzing the user's current state compared to the user's state any number of minutes ago to determine whether playback suggestions are warranted. More on this aspect will be discussed below in FIG. 4.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Imagine the following scenario: a user is currently attending a meeting, seminar, or class room lecture in which several topics are discussed. As the discussion progresses to insurance and tax issues, the user becomes bored and is easily distracted by incoming email. Minutes later, the topic has changed to something more interesting to the user but the user realizes that he has missed the beginning of the discussion because he was too engrossed in his email. If only the user could re-listen to the last 30 seconds or so to hear the beginning of the discussion. Alternatively, imagine that the user has been listening intently but missed or misunderstood a phrase the speaker said. The subject application provides systems and methods that facilitate recording live meetings or conversations which allow the user to re-hear (or view) some portion of the recorded data in order to easily and quickly catch up to the live conversation and readily join back in. Throughout the application, the terms live meeting or live conversation are meant to include a face-to-face meeting as well as a meeting facilitated by phone, teleconferencing, or a computer. Similarly, the term live data as used herein is meant to include any data obtained from an in-person meeting or from a meeting facilitated by some other communication means.

For discussion purposes, the application will be discussed with respect to audio data but it should be appreciated that it is also applicable to visual-based data that might be included in the meeting or experience that the user is currently attending. In addition, the systems and methods described herein can be utilized as a 'standalone' device or as part of any computing device such as a computer, laptop, PDA, cell phone, smart phone, or other portable or non-portable device.

Figure 1:
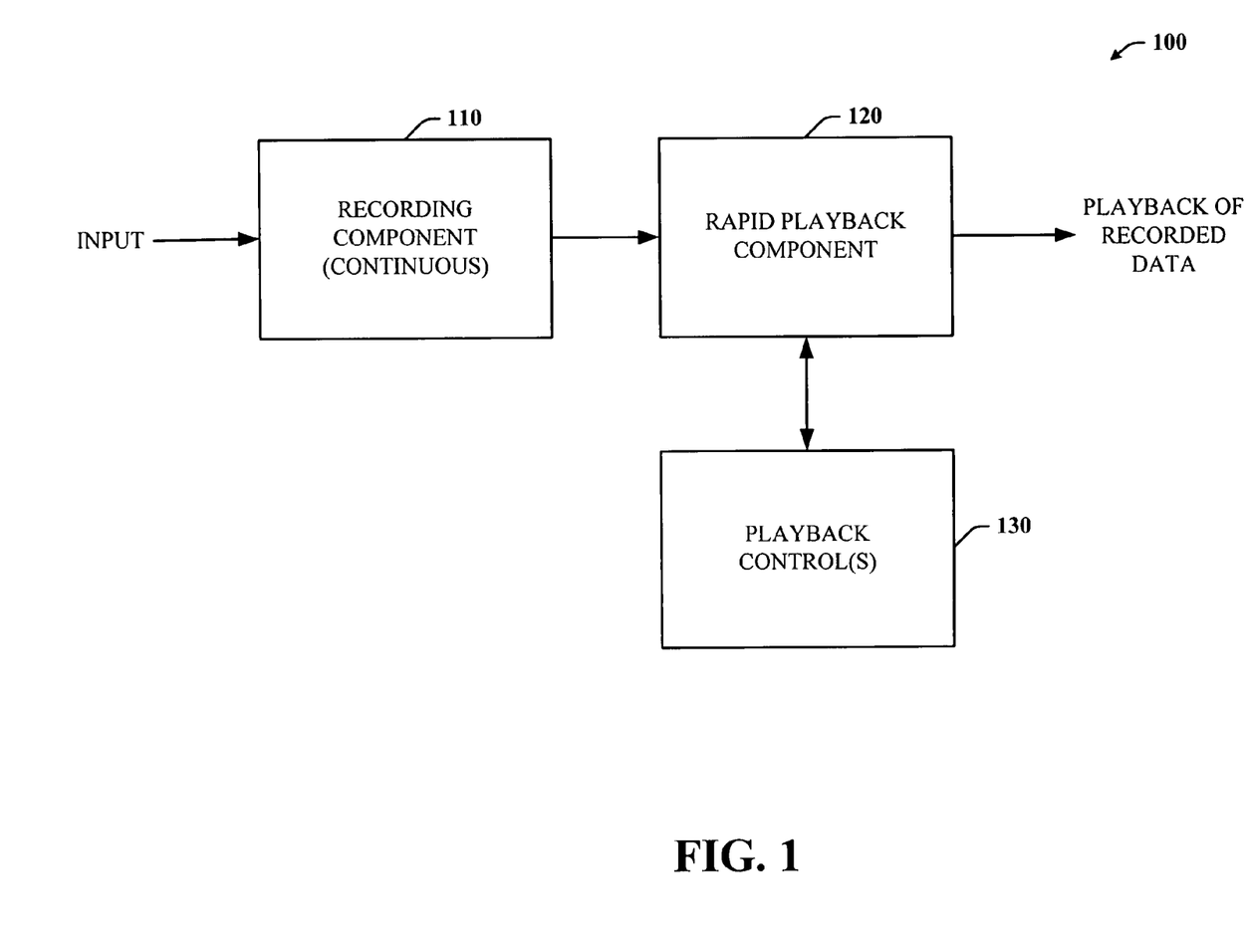
FIG. 1 is a block diagram of an audio-video recording system for live meetings that facilitates providing immediate playback of information.

Referring now to FIG. 1, there is a general block diagram of an audio-video recording system 100 for live meetings that facilitates providing immediate playback of the recorded information during the meeting to improve the user's experience. The system 100 includes a recording component 110 that can record live audio input or data in a continuous manner. A rapid playback component 120 can be employed to re-play any part or portion of the recorded data on-demand as desired by a user. The mode or manner of the playback can be regulated by one or more playback controls 130 that allow the user to control the speed of the playback as well as the portion of data to be played back. For example, the recorded data can be navigated based on a time-oriented slider control according to when the recording began. The user can drag the slider control to a position that coincides with some increment of time (e.g., 10 seconds ago) on the slider control in order to re-listen to the data recorded at that time or during that span of time. Playback of any recorded data can occur concurrently with the continuous recording of any new audio. Thus, the user need not choose between recording the current audio and re-listening to previously recorded audio. Because the recording continues during playback, the user can hear the desired amount of data recorded beginning from some time ago (e.g., 50 seconds ago) all the way up to the current conversation as desired. Hence, substantially no information is missed by initiating a playback.

Moreover, the user can determine the speed of the playback. For instance, the playback can occur faster than real-time in order to provide the information to the user in an efficient manner so that he can quickly join in or return to the current discussion. Alternatively or in addition, the playback can be slowed down or maintained in real-time. This can be helpful when the speaker is difficult to understand or when the subject matter itself is challenging to the user. Furthermore, the speed can vary during any segment of playback. For example, imagine that the user wants to re-listen to a 30-second segment of audio. He may wish to listen to the first portion of that segment faster than real-time so that every word can be heard and comprehended and then listen to a later portion of that segment at a faster speed so that only some of the words are comprehendible (e.g., every m words, where m is an integer greater than one).

Figure 2:
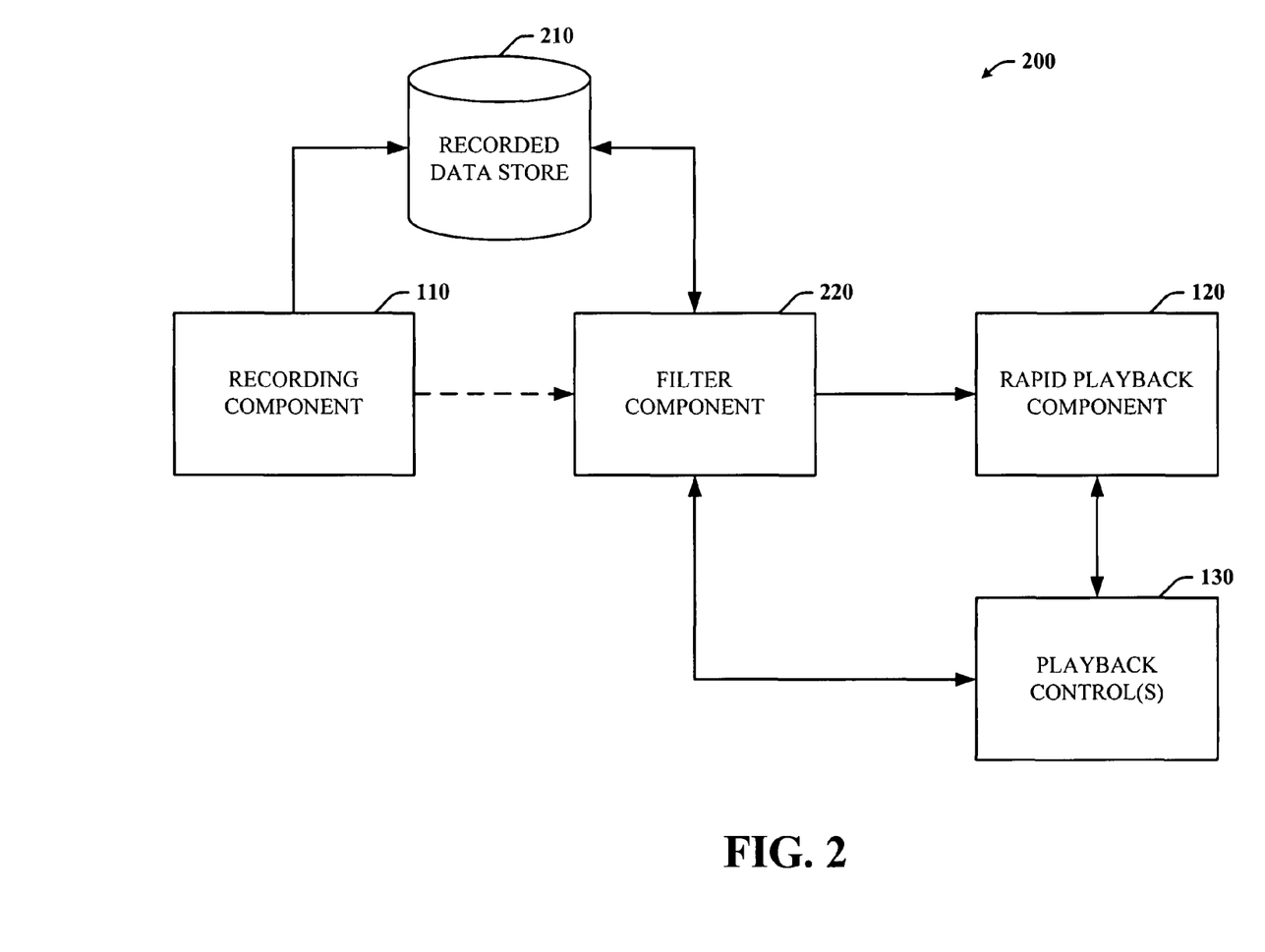
FIG. 2 is a block diagram of an audio-video recording system for live meetings that facilitates providing immediate playback of selected information.

Referring now to FIG. 2, there is a block diagram of an audio-video recording system 200 for live meetings that provides immediate playback of selected information. The system 200 includes the recording component 100 as described above in FIG. 1 which can store the recorded data in one or more data stores 210. Using one or more filtering components 220, selected content can be played back to the user via the rapid playback component 120. For example, the user can exclude background noises or other undesired audio from the playback so that only the speaker can be heard. If the user was typing or if other users were typing or making noises around him, he can filter such sounds so that the speaker's voice can be more easily heard. Such filtered audio can be stored in the data stores 210 in the event the user wishes to re-play this portion of audio again in the future. In addition, any replayed segments can be stored as separate pieces (files) of audio to allow the user to track which portions of the meeting he wanted to re-listen to.

Figure 3:
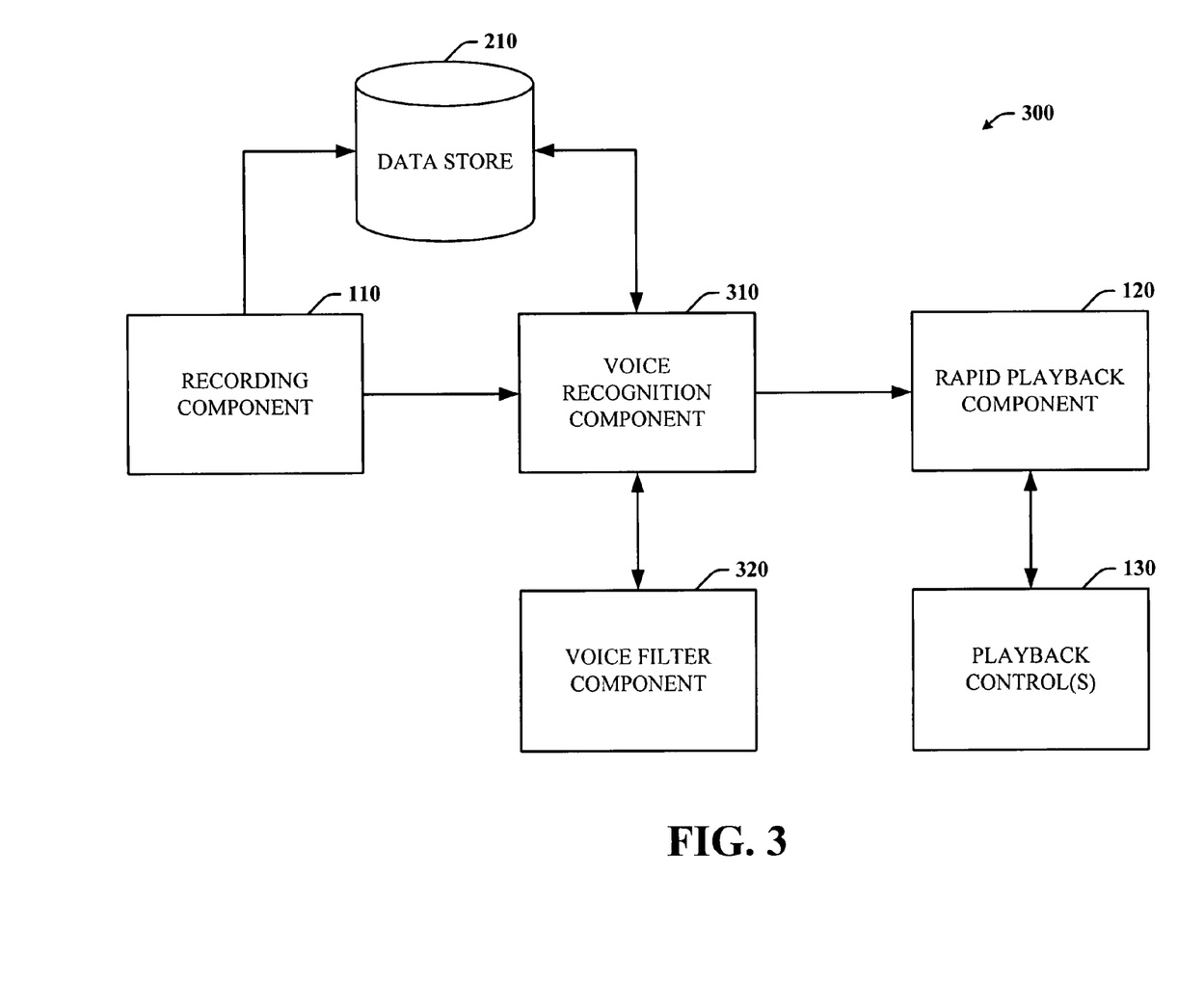
FIG. 3 is a block diagram of an audio-video recording system for live meetings that facilitates providing immediate playback of selected information in part by employing speech recognition techniques.

Now imagine that aside from the user-listener there is more than one speaker participating in the meeting or discussion. The audio-video recording system 300 illustrated in FIG. 3 can provide immediate or near immediate playback of selected portions of recordings based in part on employing speech recognition techniques. Recall that the recording component 110 can receive and record any audio data in real-time. Thus, any sounds whether words or noise can be recorded. However, the user may not be interested in re-hearing the different speakers. That is, he may be only interested in re-listening to comments from one of the speakers. In order to exclude any unwanted speech or audio from the playback, a voice recognition component 310 can be employed to distinguish between and/or identify the different speakers. Once the different speakers are identified, the user can select which speakers to include or exclude by way of a voice filter component 320.

In practice, for example, Paul is attending a seminar on the topic of foot and ankle surgical procedures paneled by 4 respected surgeons in the field. Paul records the seminar using the personal audio-video recording system as described in FIGS. 1-3, supra. During the seminar, Paul misses about 5-6 minutes of the interesting discussion because he received a text message and wanted to respond to it. To get back on track with the current discussion, Paul needs to know what he missed so he utilizes the appropriate playback control 130 to go back 3-4 minutes in the recording. One caveat is that Paul is not interested in the side comments from the audience or from the moderator. Thus, he can eliminate parts or pieces of the discussion that he is not interested in by using voice and/or speech recognition techniques. This means that Paul can skip anything said by one or more people in the selected span of playback.

Furthermore, speech and/or voice recognition can be employed to facilitate providing a text display of any recognized speech. The text display can correspond to the language recorded from the live meeting or to another language as determined by the user. In particular, any recorded data selected for playback and/or text display can be translated into a particular language and replayed or displayed in text to the user in the chosen language.

Figure 4:
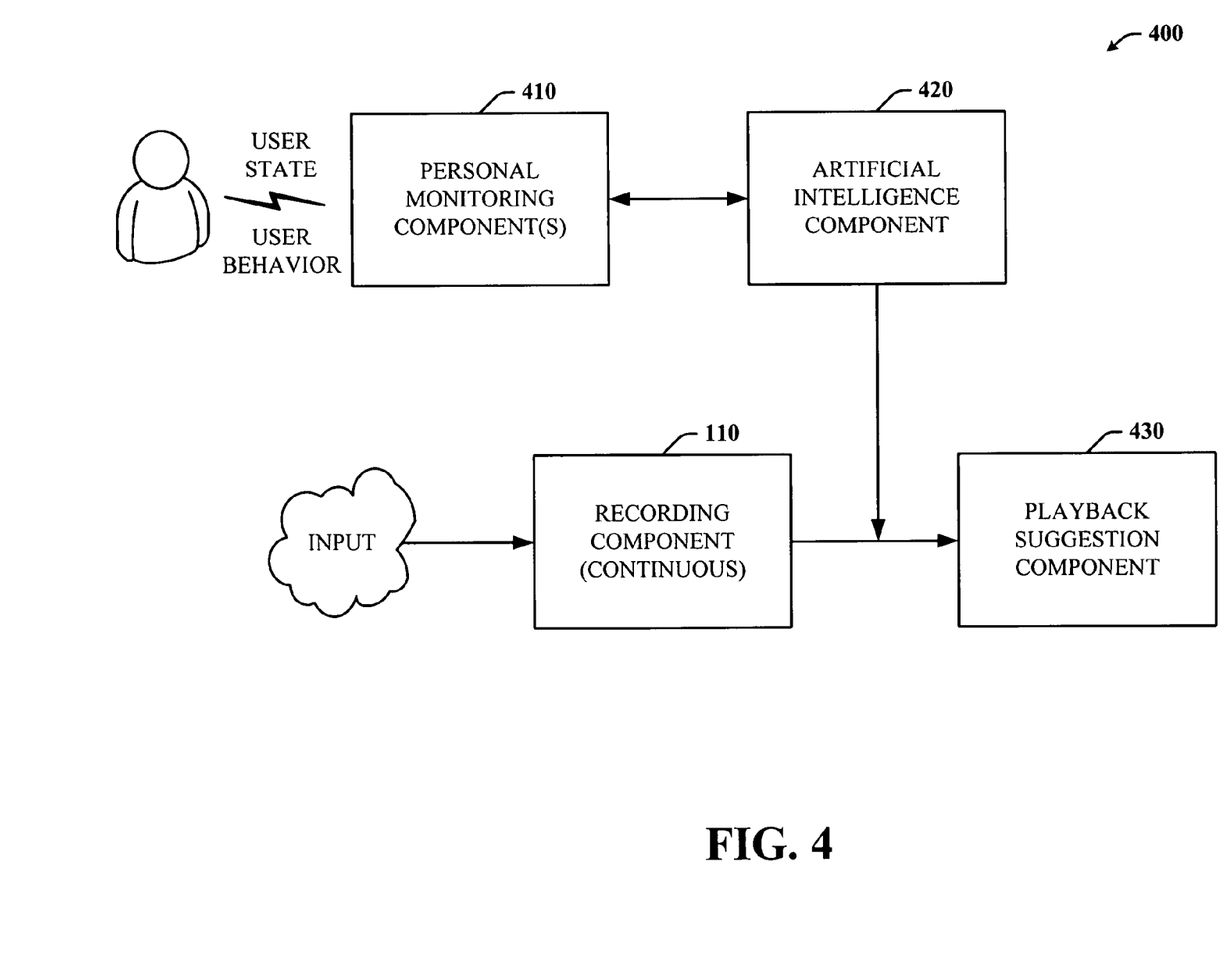
FIG. 4 is a block diagram of an audio-video recording system for live meetings that facilitates estimating when a user experiences a loss of attention and providing suggestions of playback information based on the estimations.

Turning now to FIG. 4, there is a block diagram of an audio-video recording system 400 for live meetings that facilitates estimating when a user experiences a loss of attention and that provides suggestions of playback information based on such estimations. In addition to the recording and playback components as discussed in FIG. 1, supra, for example, the system 400 includes a personal monitoring component 410 such as a camera that can observe the user's behavior. Depending on the user's observed behavior, an artificial intelligence component 420 (or machine learning) can estimate about when the user began to lose attention. Based on this estimation, a playback suggestion component 430 can suggest likely time points of playback based on the user's estimated start or length of inattentiveness. For example, the camera can observe the user's eyes looking down which can be learned or inferred to indicate a loss of attention. More complex physical movements or gestures can also be learned or inferred to correspond to inattentiveness.

In addition, the absence of the user can also be learned to indicate a loss of attention. For example, suppose the user leaves for a few minutes to use the restroom or to get a glass of water. The camera can detect the absence of the user, mark the length of the user's absence and then when the user returns (e.g., the user's presence is detected), time points of playback corresponding to the user's absence can be offered to the user.

Alternatively, the personal monitoring component 410 can monitor and analyze various types of information pertaining to the user to determine the appropriate behavior for the user during any particular time period to ultimately ascertain whether the user is in fact inattentive. For example, suppose that the user activates the personal recording component. Upon this activation, the monitoring component 410 can begin examining the user's overall state in part by looking at the user's calendar. The monitoring component can recognize that the user is (or should be) attending a meeting. The user may begin taking notes on his laptop during the meeting using a word processing program. The monitoring component 410 can treat this behavior or activity as indicative of attentiveness to the meeting based at least in part on a comparison of terms included in the calendar item and in the text (of the notes). However, at some later time during the meeting (calendar indicates start and end time and duration of the meeting), suppose the user opens an email program and/or is reading and sending email. Or suppose that the user begins sending and receiving instant messages (e.g., and the text does not relate to the meeting subject matter). This behavior or activity can be learned as an indication of inattentiveness or a loss-of-attention.

The personal monitoring component 410 can also observe the user's state with respect to any computer related activity and detect changes in activity that may be inconsistent with the user's state. For example, the meeting may include an online slide presentation that each meeting participant can access from the Web and use as reference materials for the meeting. During the discussion, however, the user opens another window for the Web and goes to a different website. The content of this or any other opened website or file can be analyzed and compared to the content of the slide show. If no relation is found or if the content is found to be inconsistent, then the system can conclude that the user has become inattentive. The artificial intelligence component 420 can base its determinations on historical user behavior or activity with respect to the timing of previous playback requests (e.g., when the user requested playbacks). Likewise, certain types of recorded data can be automatically eliminated or skipped in the playbacks according to user preferences or historical actions.

Figure 5:
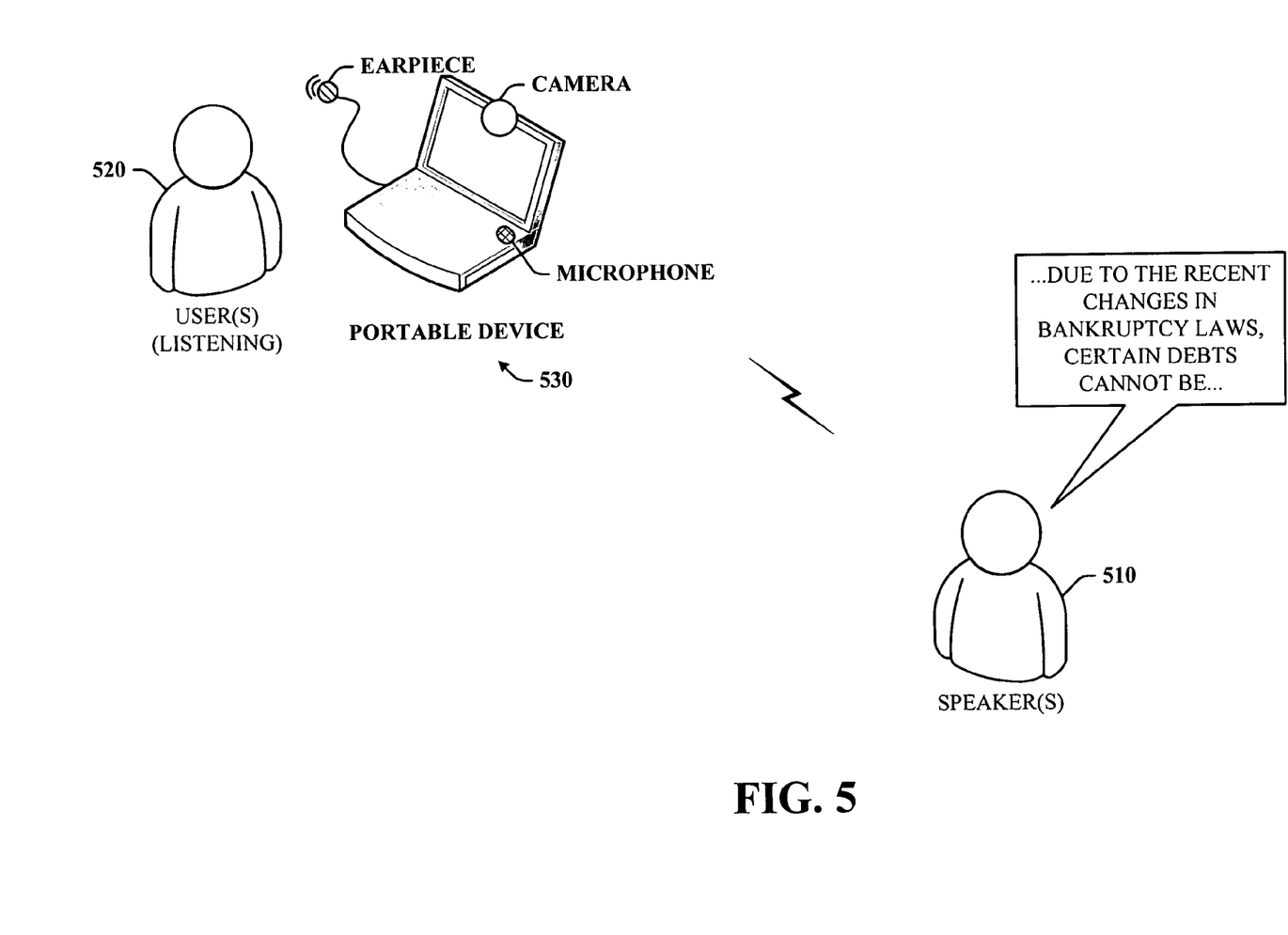
FIG. 5 is a block diagram that demonstrates the employment of a personal audio-video recorder in the context of a live meeting or conversation with at least one speaker.

Referring now to FIG. 5, there is a block diagram that demonstrates the employment of a personal audio-video recorder in the context of a live meeting or conversation with at least one speaker 510. A user 520 may be utilizing the personal recorder on his portable device 530 (e.g., laptop) which may include a camera, microphone, and earpiece for private listening of the recording. The camera can be optional feature to observe the user's behavior or actions in order to estimate when a loss of attention has occurred so that one or more segments of the recordings can be offered to the user for playback.

Various methodologies will now be described via a series of acts. It is to be understood and appreciated that the subject system and/or methodology is not limited by the order of acts, as some acts may, in accordance with the subject application, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject application.

Figure 6:
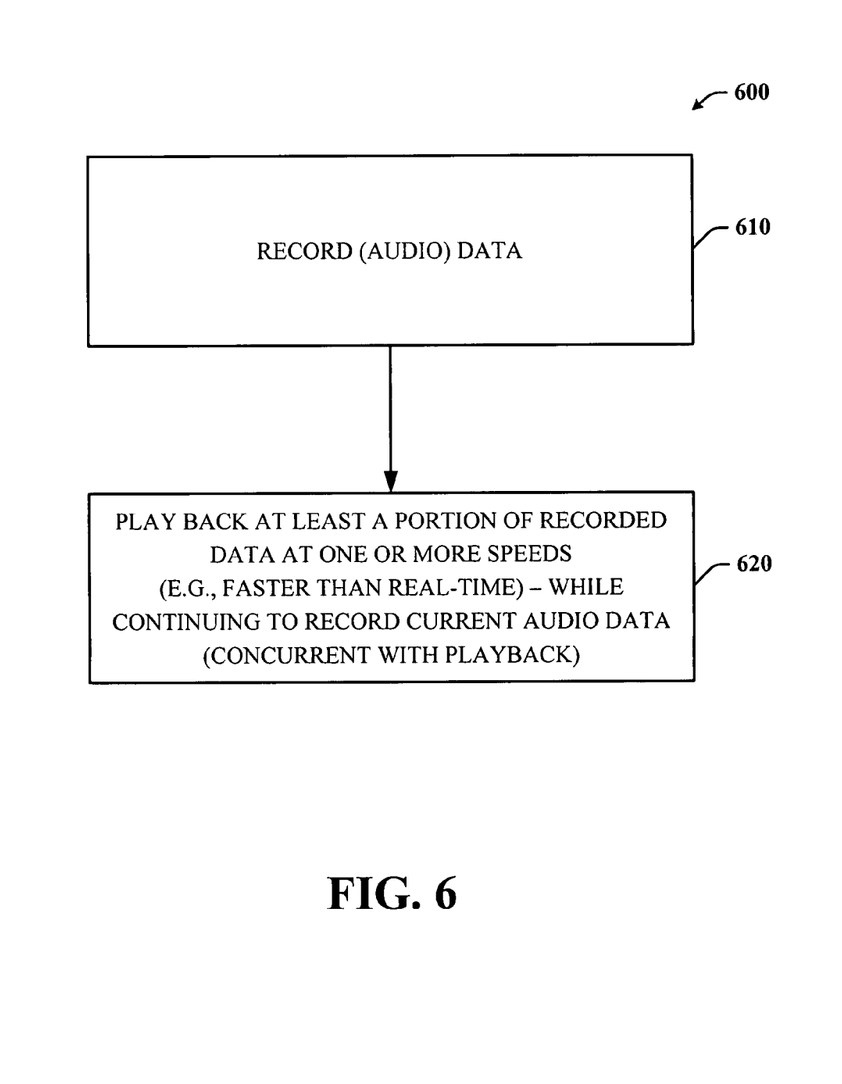
FIG. 6 is a flow diagram illustrating an exemplary methodology that facilitates recording meetings and making such recordings immediately or near immediately available for playback during the meeting so that the user can catch up and readily rejoin in the current discussion.

Turning now to FIG. 6, there is a flow diagram illustrating an exemplary methodology 600 that facilitates recording meetings and making such recordings immediately or near immediately available for playback during the meeting so that the user can catch up and readily rejoin in the current discussion. The methodology 600 involves recording audio data at 610 and then selectively playing back at least a portion of the recorded data at one or more speeds (at 620) so that the user can quickly catch up to the current discussion without missing any of the discussion. That is, recording of the current discussion continues during playback of the previously recorded data. In addition, the recorded data can be re-played at a speed that is faster than real-time in which substantially all of the bits are re-played or alternatively, at least a subset of the bits are re-played. Playing the data back at a pace that is faster than real-time allows the user to readily catch up to the current conversation without unduly compromising the sound quality and clarity of the playback.

Figure 7:
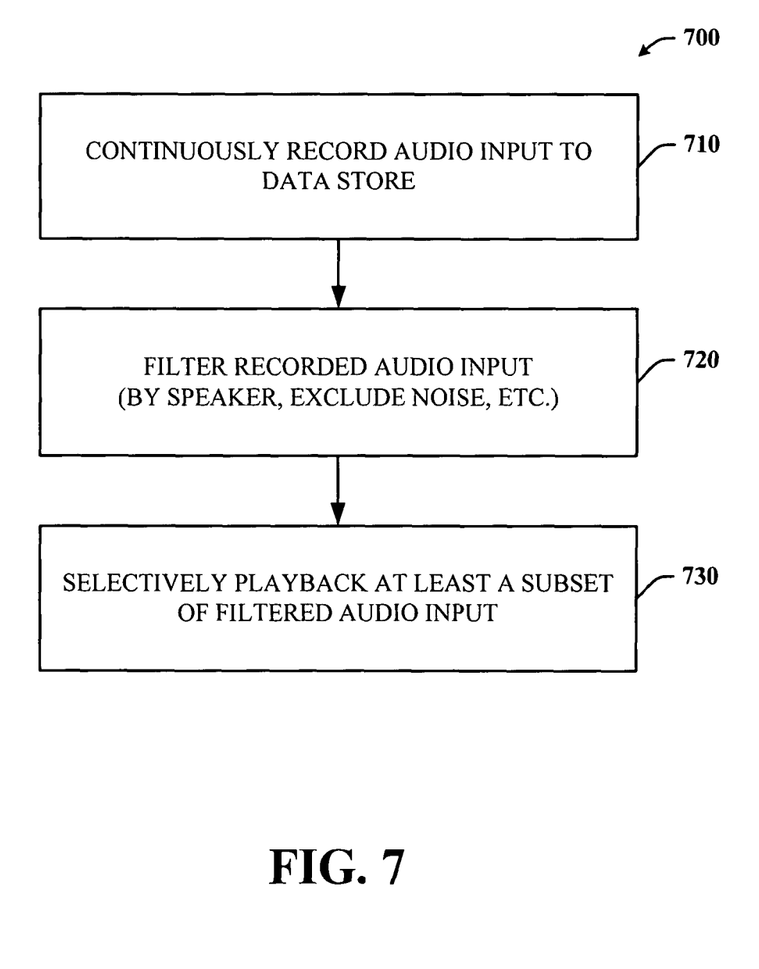
FIG. 7 is a flow diagram illustrating an exemplary methodology that facilitates recording live meetings and selectively playing back at least a portion of the recorded information.

In FIG. 7, there is a flow diagram illustrating an exemplary methodology 700 that facilitates recording live meetings and selectively playing back at least a portion of the recorded information. The methodology 700 involves continuously recording audio data and storing the recorded data to one or more data stores at 710. Following, at least a portion of the recorded data can be filtered to eliminate, skip, or exclude various types of audio at 720. For instance, background noises can be eliminated or certain voices (speakers' voices) can be eliminated or skipped from the playback version. At least a portion of the filtered recording can be played for the user at 730. The filtered recordings can be stored for later retrieval. In addition, the filtering can be performed automatically or by specific request by the user.

Figure 8:
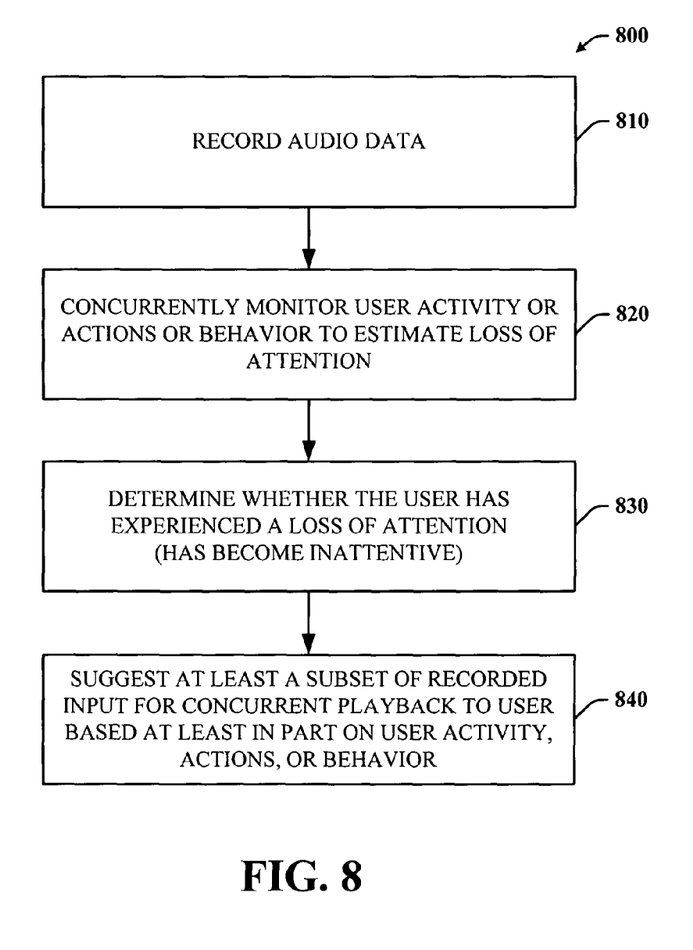
FIG. 8 is a flow diagram illustrating an exemplary methodology that facilitates recording live meetings concurrently with monitoring user behavior for inactivity or loss of attention and suggesting at least a portion of the recorded information to play back to the user based on the user's inactivity or loss of attention.

Referring to FIG. 8, there is a flow diagram illustrating an exemplary methodology 800 that facilitates recording live meetings concurrently with monitoring user behavior for inactivity or loss of attention and suggesting time points of playback to the user based on the user's inactivity or loss of attention. The methodology 800 involves recording the audio data at 810 concurrently with monitoring user activity, actions, or behavior at 820. At 830, any information collected from the monitoring can be analyzed in order to determine whether the user has experienced a loss of attention and an estimation of when the loss or losses occurred. As a result, likely time points of playback corresponding to the approximate times of inattentiveness can be suggested or offered to the user at 840. Artificial intelligence or machine learning techniques can be employed to determine whether the user has become inattentive or if the user's behavior is consistent with the current meeting, discussion, or conversation.

Figure 9:
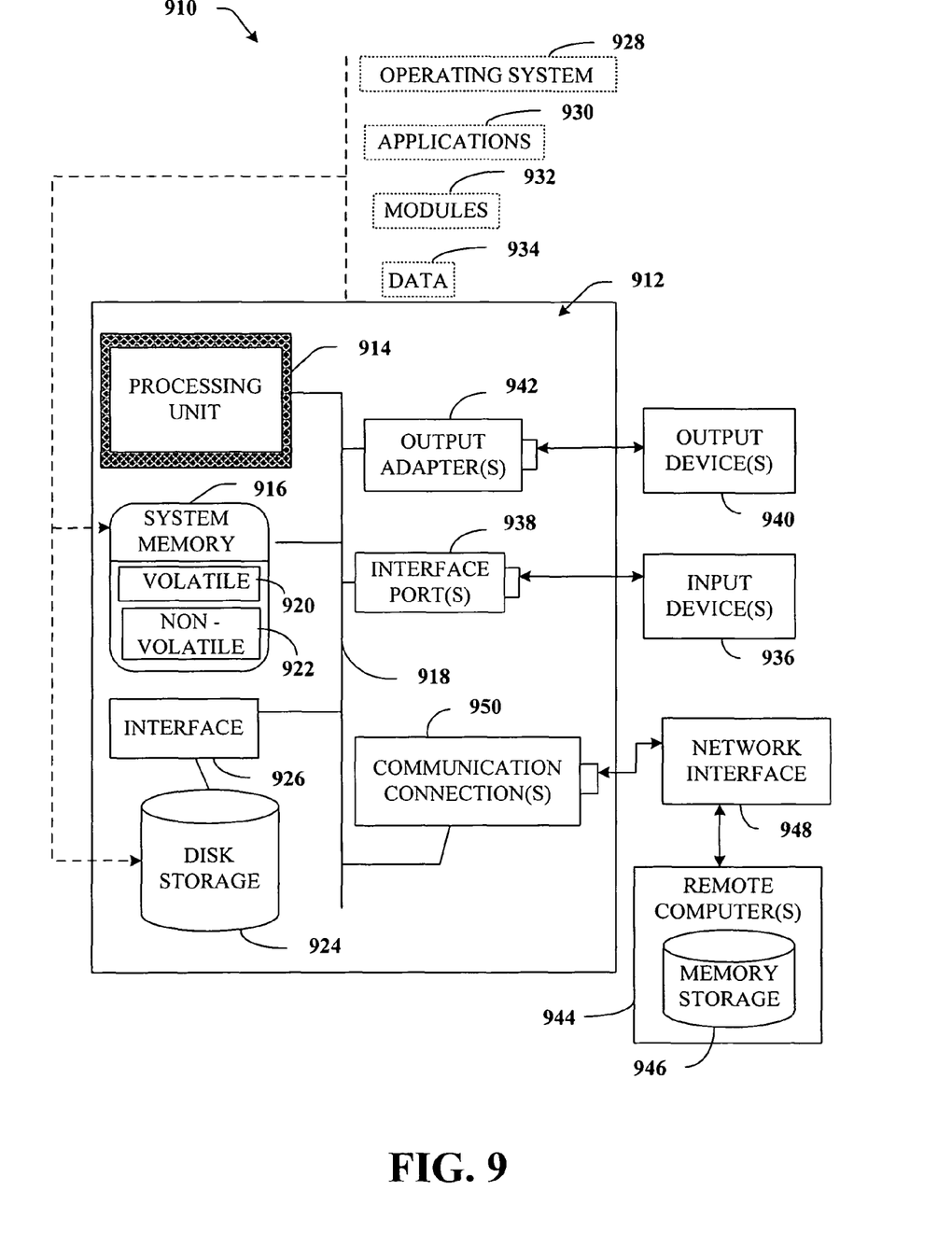
FIG. 9 illustrates an exemplary environment for implementing various aspects of the invention.

In order to provide additional context for various aspects of the subject invention, FIG. 9 and the following discussion are intended to provide a brief, general description of a suitable operating environment 910 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 910 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/nonremovable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token RingIEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

What has been described above includes examples of the subject system and/or method. It is, of course, not possible to describe every conceivable combination of components or methodologies for purposes of describing the subject system and/or method, but one of ordinary skill in the art may recognize that many further combinations and permutations of the subject system and/or method are possible. Accordingly, the subject system and/or method are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A recording system that facilitates providing playback of recorded information comprising:
    a recording component that receives and records live data, the live data including an online slide presentation for a meeting;
    a rapid playback component that provides playback of at least a subset of recorded data concurrently with recording of any current live data;
    a personal monitoring component that observes at least one of user behavior, user actions, and user activity to ascertain whether a loss of attention of a user has occurred during the meeting, and compares content of a computer file opened by the user at a computer with content of the online slide presentation, the online slide presentation being available to the user to open at the computer when the computer file is opened by the user and the user is participating in the meeting;
    a voice recognition component that identifies voices of multiple speakers included in the live data;
    a voice filter component that selects a speaker from the multiple speakers whose data recorded has been identified to be interesting to the user; and
    a playback suggestion component that suggests at least one segment of recorded data relating to the speaker to playback based at least in part on when the loss of attention occurred and a selection of the speaker.

2. The system of claim 1 further comprises one or more playback controls that regulate at least one of speed and subset of the recorded data selected for playback.

3. The system of claim 1, the rapid playback component plays the recorded data faster than real-time which facilitates getting caught up to the current live data.

4. The system of claim 1 further comprises a filter component that substantially eliminates background noise or any other audible data not of interest from the playback.

5. The system of claim 1 further comprises a recorded data store that stores at least one of the following: recorded data and filtered recorded data.

6. The system of claim 1 wherein the voice recognition component that identifies voices of different speakers included in the audible live data; and a voice filter component selectively skips or excludes the recorded data corresponding to at least one voice during playback.

7. The system of claim 1 further comprises an artificial intelligence component that estimates when the loss of attention occurred.

8. The system of claim 7, the artificial intelligence component estimates when the loss of attention occurred, and duration of the loss of attention in part by analyzing user behavior to determine whether any changes occurred therein.

9. The system of claim 1, the personal monitoring component comprises a monitoring device that captures at least one of movements, gestures, user absence or user presence.

10. The system of claim 1, wherein the personal monitoring component is further configured to observe at least one of user behavior, user actions, and user activity by comparing one or more terms in a calendar with one or more terms in a text that the user inputs during a meeting, the calendar indicating a starting and an ending time of the meeting.

11. A method that facilitates recording a live meeting performed by a process ring unit executing computer-executable instructions stored on a computer storage media, the method comprising:
   recording live audio-video data;
   playing back at least a portion of the data recorded at one or more speeds concurrently with recording any current live data to facilitate quickly reviewing at least a portion of the data in order to join back into the current live meeting;
   monitoring at least one of user activity, user behavior, and user actions, the monitoring occurring concurrently with the recording the live audio-video data, the monitoring including using a monitoring device to observe a behavior of a user during the live meeting to indicate a loss of attention of the user, the user being an attendee of the live meeting;
   identifying multiple speakers in the data recorded;
   selecting a speaker from the multiple speakers whose data recorded has been identified to be interesting to a user; and
   suggesting at least one segment of data recorded relating to the speaker to play back based on at least an estimation of when the loss of attention occurred and a selection of the speaker.

12. The method of claim 11 further comprises filtering at least a subset of the data recorded before playback of the subset to facilitate eliminating undesirable content.

13. The method of claim 11, wherein the playing back comprises playing back at least a portion of the data recorded at a speed faster than real-time to facilitate getting caught up to join back into a current live meeting.

14. The method of claim 11 further comprises identifying multiple voices of the multiple speakers included in the data recorded and filtering at least one voice to facilitate skipping over the voice.

15. The method of claim 11, wherein the playing back comprises playing back at least a portion of the data recorded is performed by at least one of the following: speaking selected portions of the data or displaying text corresponding to recognized speech.

16. The method of claim 11, wherein the monitoring comprises inferring the user's eyes looking down observed by the monitoring device as an indication of the loss of attention.

17. The method of claim 11, wherein the monitoring device includes a camera.

18. The method of claim 11, wherein the monitoring comprises:
   finding a scheduled activity of the user based on a calendar; and
   comparing an action of the user with the scheduled activity when the scheduled activity is due to ascertain whether the loss of attention of the user has occurred.

19. The method of claim 11, wherein the monitoring comprises comparing content of a computer file opened by the user at the computer with content of an online slide presentation included in the live audio-video data to ascertain whether the loss of attention of the user has occurred, the online slide presentation being available to the user to open at the computer when the computer file is opened by the user and the user is participating in the live meeting.

20. A memory having computer-executable instructions encoded thereon that upon execution configure a computer to perform operations comprising:
   receiving and recording audible live data;
   providing playback of at least a subset of recorded data concurrently with recording of any current live data;
   monitoring at least one of user behavior, user actions, and user activity to facilitate estimating when a loss of attention has occurred, the monitoring including finding a scheduled activity of a user based on a calendar and comparing an action of the user with the scheduled activity when the scheduled activity is due;
   identifying multiple speakers in the recorded data;
   selecting a speaker from the multiple speakers whose data recorded has been identified to be interesting to a user; and
   suggesting at least one segment of data recorded relating to the speaker to play back based on at least an estimation of when the loss of attention occurred and a selection of the speaker.

* * * * *